(12) United States Patent
Roeback

(10) Patent No.: US 11,928,486 B2
(45) Date of Patent: *Mar. 12, 2024

(54) COORDINATING AND SYNCHRONIZING DATA ENTRY BETWEEN CLIENT COMPUTING DEVICES

(71) Applicant: Truist Bank, Charlotte, NC (US)

(72) Inventor: Gerald O. Roeback, Stone Mountain, GA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,028

(22) Filed: Apr. 25, 2023

(65) Prior Publication Data

US 2023/0325210 A1 Oct. 12, 2023

Related U.S. Application Data

(63) Continuation of application No. 17/714,607, filed on Apr. 6, 2022, now Pat. No. 11,681,538.

(51) Int. Cl.
| | |
|---|---|
| G06F 9/451 | (2018.01) |
| G06F 3/04817 | (2022.01) |
| G06F 9/445 | (2018.01) |
| G06F 21/64 | (2013.01) |
| G06F 40/174 | (2020.01) |

(52) U.S. Cl.
CPC .......... *G06F 9/451* (2018.02); *G06F 3/04817* (2013.01); *G06F 9/44526* (2013.01); *G06F 21/645* (2013.01); *G06F 40/174* (2020.01)

(58) Field of Classification Search
CPC ..... G06F 9/451; G06F 3/04817; G06F 40/174
See application file for complete search history.

(56) References Cited

U.S. PATENT DOCUMENTS

| | | | |
|---|---|---|---|
| 11,681,538 B1 | 6/2023 | Roeback | |
| 2005/0251535 A1* | 11/2005 | Theissen | G06Q 10/10 |
| 2009/0271696 A1 | 10/2009 | Bailor et al. | |
| 2013/0219296 A1 | 8/2013 | Thazhmon et al. | |
| 2013/0238312 A1* | 9/2013 | Waibel | G06F 40/117 |
| | | | 704/8 |
| 2014/0143672 A1 | 5/2014 | Kim et al. | |
| 2015/0288756 A1 | 10/2015 | Larabie-Belanger | |
| 2020/0092285 A1* | 3/2020 | Graham | H04L 63/18 |
| 2021/0090559 A1* | 3/2021 | Kosik | G06F 1/3206 |
| 2022/0159056 A1* | 5/2022 | Rose | G06F 21/32 |
| 2022/0188688 A1* | 6/2022 | Launay | G06N 20/00 |
| 2022/0215012 A1* | 7/2022 | Rajanigandha | G06F 16/258 |

\* cited by examiner

*Primary Examiner* — Mong-Shune Chung
(74) *Attorney, Agent, or Firm* — Kilpatrick Townsend & Stockton LLP; Michael A. Springs, Esq.

(57) ABSTRACT

A client device can generate a graphical user interface (GUI) including a set of form fields. The client device can receive user input including a first set of form values for the set of form fields from a first entity via the GUI. The client device can also receive an electronic communication via a network, the electronic communication including a second set of form values for the set of form fields as input by a second entity on a remote client device. The client device can compare the second form values to the first form values to identify a mismatch between the first set of form values and the second set of form values. In response to identifying the mismatch, the client device can update the GUI to include a graphical marker indicating the mismatch between the first set of form values and the second set of form values.

20 Claims, 8 Drawing Sheets

COORDINATING AND SYNCHRONIZING DATA ENTRY BETWEEN CLIENT COMPUTING DEVICES

CROSS-REFERENCE TO RELATED APPLICATION

This is a continuation of co-pending U.S. patent application Ser. No. 17/714,607, filed Apr. 6, 2022, titled "COORDINATING AND SYNCHRONIZING DATA ENTRY BETWEEN CLIENT COMPUTING DEVICES," the disclosure of which is hereby incorporated by reference in its entirety.

TECHNICAL FIELD

The present disclosure relates to coordinating inputs to client devices and, more particularly (although not necessarily exclusively), to coordinating and synchronizing data entry to client devices.

BACKGROUND

In a variety of industries, digital records ("records") are used for various purposes. Different entities may generate their own records. For example, a first entity can operate a client computing device ("client device") to enter a first set of form values for a first record. Examples of such a client device can include a desktop computer, a laptop computer, a mobile phone, or a tablet. A second entity can operate a remote client device to enter a second set of form values for a second record. In some cases, the second record can be related to the first record. For example, the first record and the second record may be collectively used to engage in a process. In some cases, the first entity may not communicate their record or form values to the second entity, and vice versa, prior to initiating the process. Rather, the first record and the second record may be kept isolated from one another prior to initiating the process.

DETAILED DESCRIPTION

Figure 1:
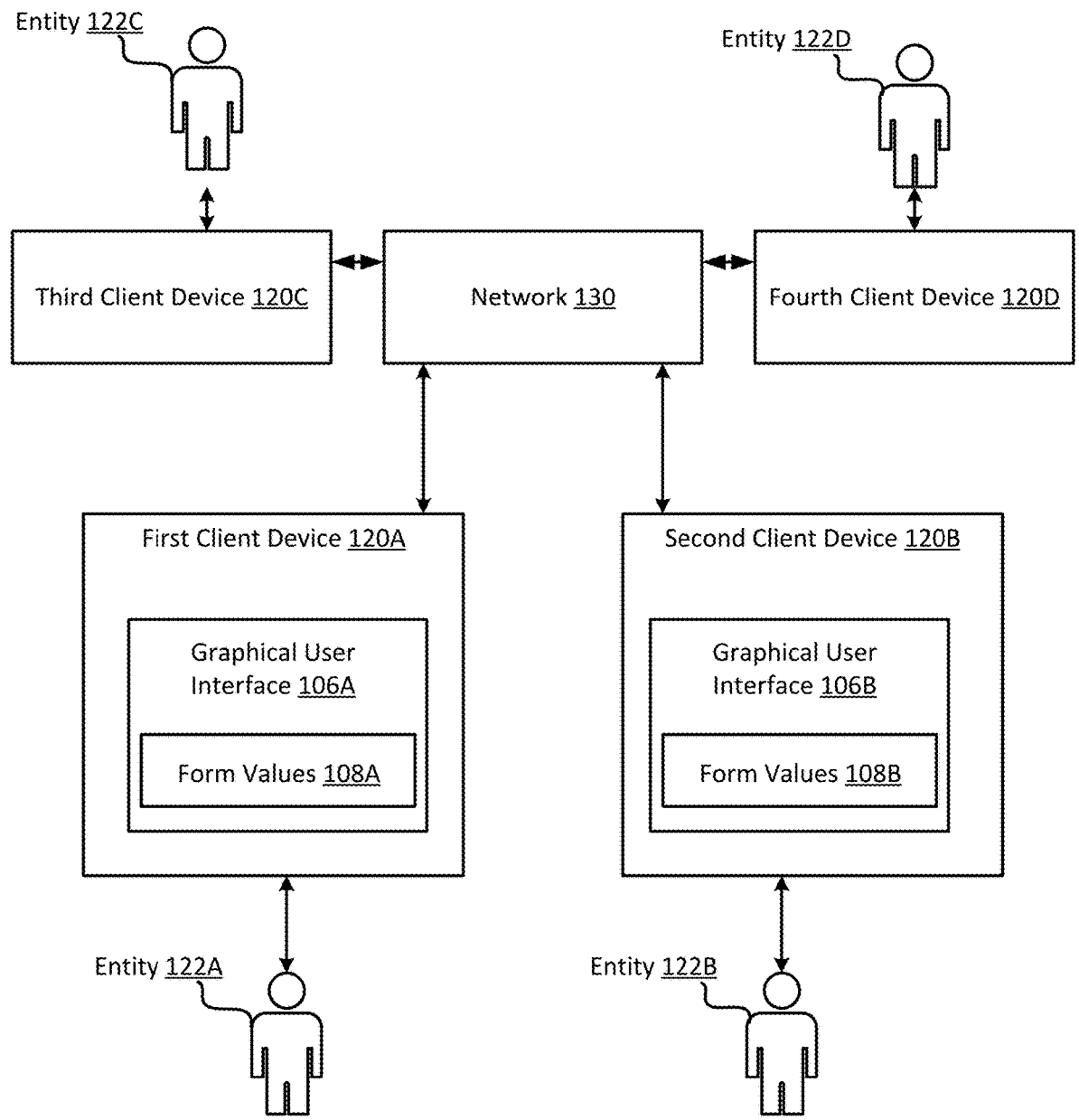
FIG. 1 is a block diagram of an example of a system for displaying a graphical user interface according to some aspects of the present disclosure.

Certain aspects and features relate to synchronizing a first set of form values input by the first entity to a first client device and a second set of form values input by a second entity to a second client device. The first set of form values and the second set of form values may be input in relation to the one or more digital records. More specifically, the first client device may generate a first graphical user interface (GUI) that can include a set form fields that may correspond to entries in a record. The first entity may enter the first set of form values into the set of form fields displayed on the first GUI. The first client device may also receive electronics communication from the second client device via a network, such as a local area network or the Internet. The electronic communications may include the second set of form values input by the second entity on the second client device. For example, the second client device may display a second GUI with the same or a similar set of form fields, into which the second entity can enter the second set of form values. As the second entity inputs the second set of form values, the second client device can transmit the electronic communications to the first client device. The first GUI can then compare (e.g., in real time) the first set of form values input by the first entity to the second set of form values input by the second entity to identify and flag discrepancies between the two. The discrepancies may be flagged in the first GUI, the second GUI, or both. For example, the first client device may transmit an alert back to the second client device indicating a discrepancy between two form values, so that a corresponding graphical notification can be output in the second GUI. This may also the two entities to synchronize their data input on the two distinct computing devices.

In some cases, the first set of form values from the first entity may be expected to agree with the second set of form values from the second entity in order for a certain process to take place. But often times, such entities fail to synchronize their form values prior to initiating the process. This failure may occur for a variety of reasons, for example due to time or resource constraints. In some cases, the first entity and second entity may not have each other's contact information and therefore cannot validate each other's form values prior to initiating the process. Disagreements or mismatches among the first set of form values and the second set of form values may result in a failure of the process. When the process fails, corresponding error logs may be stored on the system describing the failure, which wastes valuable storage space. Failure of the process may also consume significant time, energy, and resources of the first entity and second entity to correct. For example, the process may need to be executed again and the form values may need to be validated again once the problems have been corrected. This can waste processing power and memory. Re-executing the process and re-validating the form values may also generate additional network traffic among computing devices, such as the first client device and the second client device, that may be involved in resolving the problem.

Some examples of the present disclosure can overcome one or more of the abovementioned problems by automatically identifying and flagging (e.g., in real time) mismatches between a first set of form values input by a first entity on a first client device and a second set of form values input by a second entity on a second client device. The mismatches can be flagged in a first GUI of the first client device and a second GUI of the second client device. For example, the first client device can update the first GUI to include a graphical marker indicating the mismatch between the first set of form values and the second set of form values. In some examples, the graphical marker can be displayed adjacent to mismatching values in the first set of form values and the second set of form values. In some examples, the first client device may be configured to transmit a notification to the second entity indicating the mismatch. The first client device can transmit the notification to the second entity via e-mail or any other suitable communication format. In some cases, the second client device can generate a second GUI that can be displayed to the second entity for viewing the mismatch. The second GUI may include a graphical marker for indicating the mismatch that may be similar to or different from the graphical marker of the first GUI. The second GUI may prompt the second entity to resolve the mismatch by inputting a replacement value. Once the second entity has input the replacement value and resolved the mismatch, the first GUI and the second GUI may be updated to remove their respective graphical markers. By flagging mismatches among the first set of form values and the second set of form values, the GUI may allow the first entity, the second entity, or both entities to adjust their inputs prior to initiating the target process. This can reduce the likelihood of the target process failing, thereby preventing or reducing the unnecessary resource consumption described above.

In some examples, the first GUI on the first client device can include a first graphical visualization that depicts the first set of form values input by the first entity. The first GUI can also include a second graphical visualization that depicts the second set of form values input by the second entity on the second client device. The first graphical visualization may be displayed currently with and adjacent to second graphical visualization. The second client device may also generate and output a similar type of graphical user interface.

In some examples, the first GUI and the second GUI may be updated in real-time, or substantially contemporaneous to adjusting the first set of form values or the second set of form values. A graphical marker may be displayed for indicating a mismatch among the first values and the second values in one or both GUIs. In some examples, the graphical marker may include a color-coded box that can be positioned around a value that has been identified as causing a mismatch. In other examples, other types of graphical markers such as icons may be used. One or both GUIs may also include a graphical object that can be selected by a user or entity to initiate a third-party verification process for the record based on the first set of values input by the first entity and the second set of values input by the second entity. The third-party verification process can include transmitting the record to one or more third party entities for third-party verification.

In some examples, the GUIs may each include an option or prompt that can enable a user or entity to upload a list of records. For example, the first GUI may enable the first entity to upload a first list of records, and the second GUI may enable the second entity to upload a second list of records. The first client device may validate the lists of records by comparing the first list of records to the second list of records to determine if there are any mismatches among pairs of records in the lists of records. Additionally, the first client device may verify that the first list of records and the second list of records contain the same amount of records. Validating the lists of records through the above-mentioned process instead of validating the records individually through validation processes corresponding to each record may decrease an execution time associated with validating the records. Additionally, validating the lists of records may consume fewer computing resources and require less network traffic.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system for displaying a GUI according to some aspects of the present disclosure. The system may include client devices 120A-B. Examples of the client devices 120A-B can include laptop computers, desktop computers, or servers. The first client device 120A may be communicatively coupled to a second client device 120B via a network 130. The network 130 may be the internet, a LAN, or any other suitable network 130.

The client devices 120A-B may be configured to display respective GUIs 106A-B. For example, the first client device 120A may be configured to display a first GUI 106A to a first entity 122A. The first GUI 106A may include a first set of form values 108A input by the first entity 122A in relation to a first form. Similarly, the second client device 120B may be configured to display a second GUI 106B to a second entity 122B. The second GUI 106B may include a second set of form values 108B input by the second entity 122B in relation to a second form, which may be the same as or different from the first form. The sets of form values 108A-B may be manually input by the entities 122A-B, or scanned in using image recognition software. The image recognition software may make use of Artificial Intelligence or machine learning technology. The image recognition software may be able to identify properties related to the sets of form values 108A-B based on the types of values in the sets of form values 108A-B. The sets of form values 108A-B may include strings of text, numeric values, or any other suitable data type.

The sets of form values 108A-B may be related to a set of form fields for a record. The GUIs 106A-B may provide information related to the type of record, which may indicate to the first entity 122A or the second entity 122B related to the types of form values that should be entered in the sets of form values 108A-B. The GUIs 106A-B may allow both the first entity 122A and the second entity 122B to view some or all of both sets of form values 108A-B. For example, the GUI 106A may output the first set of form values 108A input by the first entity 122A as well as at least some of second set of form values 108B input by the second entity. And the GUI 106B may output the second set of form values 108B input by the second entity 122B as well as at least some of first set of form values 108A input by the first entity. In some cases, the GUIs 106A-B can allow both entities 122A-B to view and manipulate the form values concurrently.

In some examples, the GUIs 106A-B can include a tool for determining unknown values in the first set of form values 108A or the second set of form values 108B based on known values in the first set of form values 108A or the second set of form values 108B. Additionally, the GUIs 106A-B may include a "save template" function to allow the first entity 122A and the second entity 122B to save form fields associated with the first set of form values 108A or the second set of form values 108B for use in entering form values in the future.

In some examples, the graphical interfaces 106A-B can be configured to detect and flag mismatches among the first set of form values 108A and the second set of form values 108B. The GUIs 106A-B can detect a mismatch by comparing each form value in the first set of form values 108A with a corresponding form value in the second set of form values 108B. The GUIs 106A-B can be configured to notify the first entity and the second entity that a mismatch has been detected. For example, one or both of the GUIs 106A-B may generate graphical markers adjacent to the mismatching form values, so that the first entity and the second entity can easily identify the problem.

In some examples, the client devices 120A-B may be able to determine that the record is incomplete. The record may be deemed incomplete based on the first set of form values 108a missing a particular value or the second set of form values 108b missing a particular value. In response to detecting that the record is incomplete, one or both of the client devices 120A-B may transmit a notification to the first entity 122A or the second entity 122B indicating that the record is incomplete. The notification may be transmitted via an e-mail, or any other suitable means for transmitting a notification.

The first client device 120A and the second client device 120B may transmit data to each other directly or indirectly, such as through the network 130, so that the GUIs 106A-B can remain in synch with one another. In some examples, data from the first client device 120A and the second client device 120B may be transmitted to a central server, such as a cloud server, that may be communicatively coupled to the network 130. The central server may be configured to relay data between the first client device 120A and the second client device 120B. Transmitting data between the first client device 120A and the second client device 120B may allow the GUIs 106A-B to be run concurrently and remain in synch with one another.

To generate the graphical interfaces 106A-B, the first client device 120A and the second client device 120B may each execute software that allows the two client devices 120A-B to communicate with each other directly or indirectly, as described above. In some examples, the software may be a downloadable software plugin that is configured to be integrated into existing software on the client devices 120A-B. The software plugin running on the first client device 120A can transmit the first set of form values 108A to the second client device 120B. Likewise, the software plugin running on the second client device 120B can transmit the second set of form values 108B to the first client device 120A.

The first client device 120A may receive or generate the first set of form values 108A in a first format that may be compatible with the first graphical interface 106A. But, the first format may not be compatible with the second client device 120B or the second GUI 106B. So, the first client device 120A or the second client device 120B can translate the first set of form values 108A from the first format to a second format for display in the second GUI 106B. The same can happen in reverse. For example, the first client device 120A may receive the second set of form values 108B in the second format. The first client device 120A can then translate the second set of form values 108B from the second format into the first format for display in the first GUI 106A.

A third entity 122C can be connected to the network 103 via a third client device 120C, and a fourth entity 122D can be connected to the network 103 via a fourth client device 120D. The third entity 122C and the fourth entity 122D can perform a third-party verification process for verifying the first set of form values submitted to the third entity 122C by the first entity 122A and for verifying the second set of form values submitted to the fourth entity 122D by the second entity 122B. This is described in greater detail later on.

Figure 2:
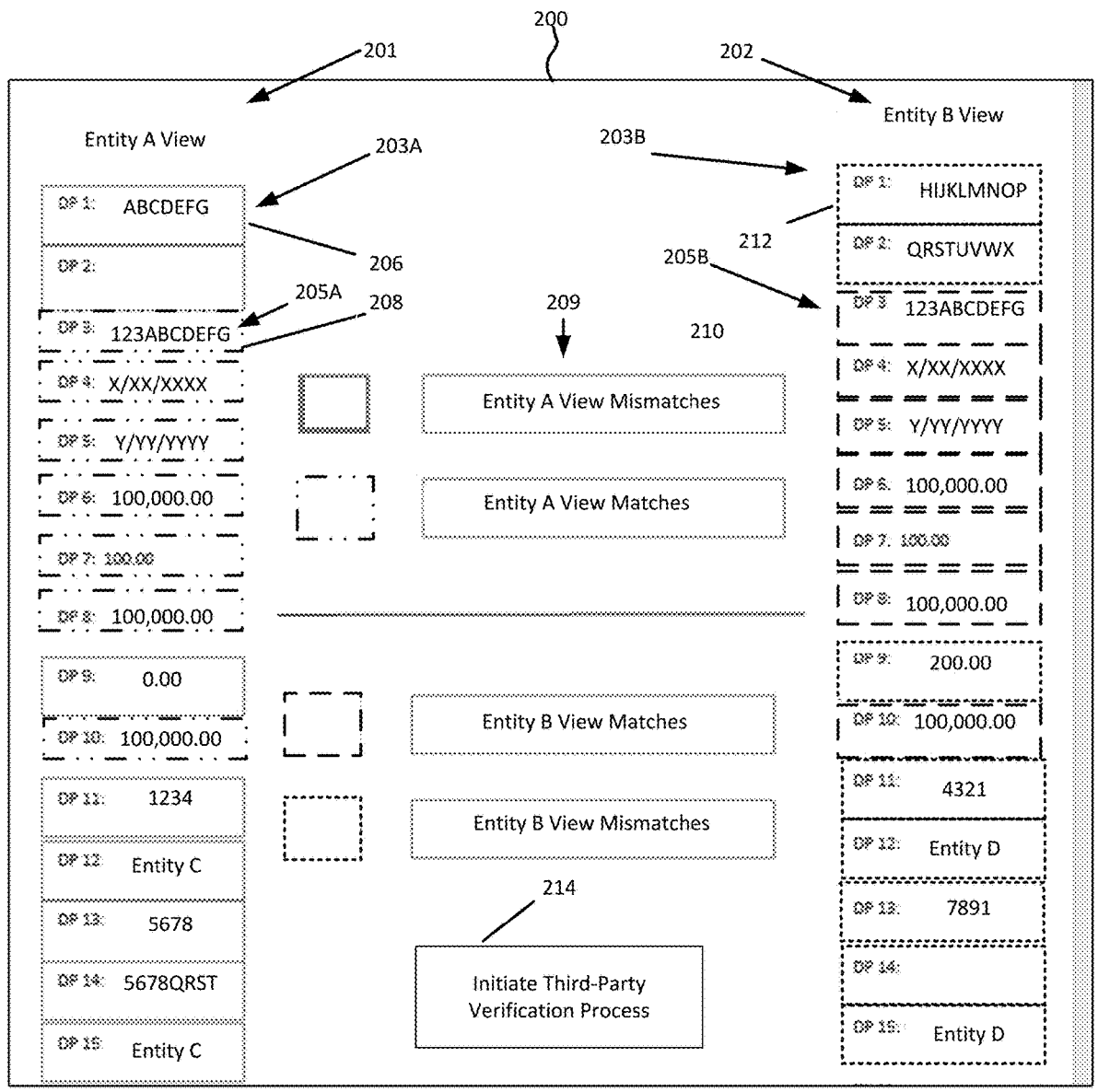
FIG. 2 depicts an example of a graphical user interface according to some aspects of the present disclosure.

FIG. 2 depicts an example of a GUI 200 according to some aspects of the present disclosure. The GUI 200 can include a first graphical visualization 201 that in this example is generally on the left-hand side of the figure. The first graphical visualization 201 may correspond to a first set of form values that may be input by a first entity on a first client device. The form values may be relayed to a set of form fields for a record. The graphical interface 200 can also include a second graphical visualization 202 that in this example is generally on the right-hand side of the figure. The second graphical visualization 202 may correspond to a second set of form values that may be input by a second entity on a second client device. The second set of form values may be related to the set of form fields for the record. The first set of form values and the second set of form values can include strings of text, numeric values, or values of any other type. In some examples, the first entity and/or the second entity may be institutions, such as banks. The record may include data related to a trade, such as a block or multi-block trade, or other transaction.

In some examples, the GUI 200 may provide a graphical marker for indicating a match or a mismatch among the first set of form values in the first graphical visualization 201 and the second set of form values in the second graphical visualization 202. The graphical marker may be a box that includes a dashed line, a solid line, a colored line, or any other suitable characteristics. Additionally or alternatively, the graphical marker may include an icon, a textual flag, or another type of indicator. In one specific example, a first form value 203A included in the first graphical visualization 201 can be a mismatch with a corresponding second form value 203B in the second graphical visualization 203B. In response to identifying the mismatch, the graphical interface 200 can display a first graphical marker 206 and a second graphical marker 212. The first graphical marker 206 may be displayed proximate the first form value 203A, and the second graphical marker 212 may be displayed proximate the second form value 203B. The GUI 200 can display a third graphical marker 208 and a fourth graphical marker 210 in response to identifying a match among a third form value 205A in the first graphical visualization 201 and a corresponding fourth form value 205B in the second graphical visualization 202. The third graphical marker 208 may be displayed proximate the third form value 205A, and the fourth graphical marker 210 may be displayed proximate the fourth form value 205B to indicate that the third form value 205A and the fourth form value 205B are matching. Indicating whether or not form values 205A-D are matching (e.g., in real time) may allow the first entity or the second entity to correct mismatches prior to updating the record. A legend 209 may provide a visual indication of differences among the graphical markers. Once the entities have input their form values and resolved any identified mismatches, the entities may each select a graphical object 214 (e.g., a button) to initiate a third-party verification process, as described below.

Although FIG. 2 shows a certain number and arrangement of interface elements, this is intended to be illustrative and non-limiting. Other examples may include more interface elements, fewer interface elements, different interface elements, or a different configuration of the interface elements than is shown in FIG. 2. For instance, in another example the GUI 200 may be split horizontally rather than vertically (e.g., so that the first entity's values are displayed across the top and the second entity's values are displayed along the bottom). Other types of graphical markers may also be used and the form values may also be displayed in other ways.

Figure 3:
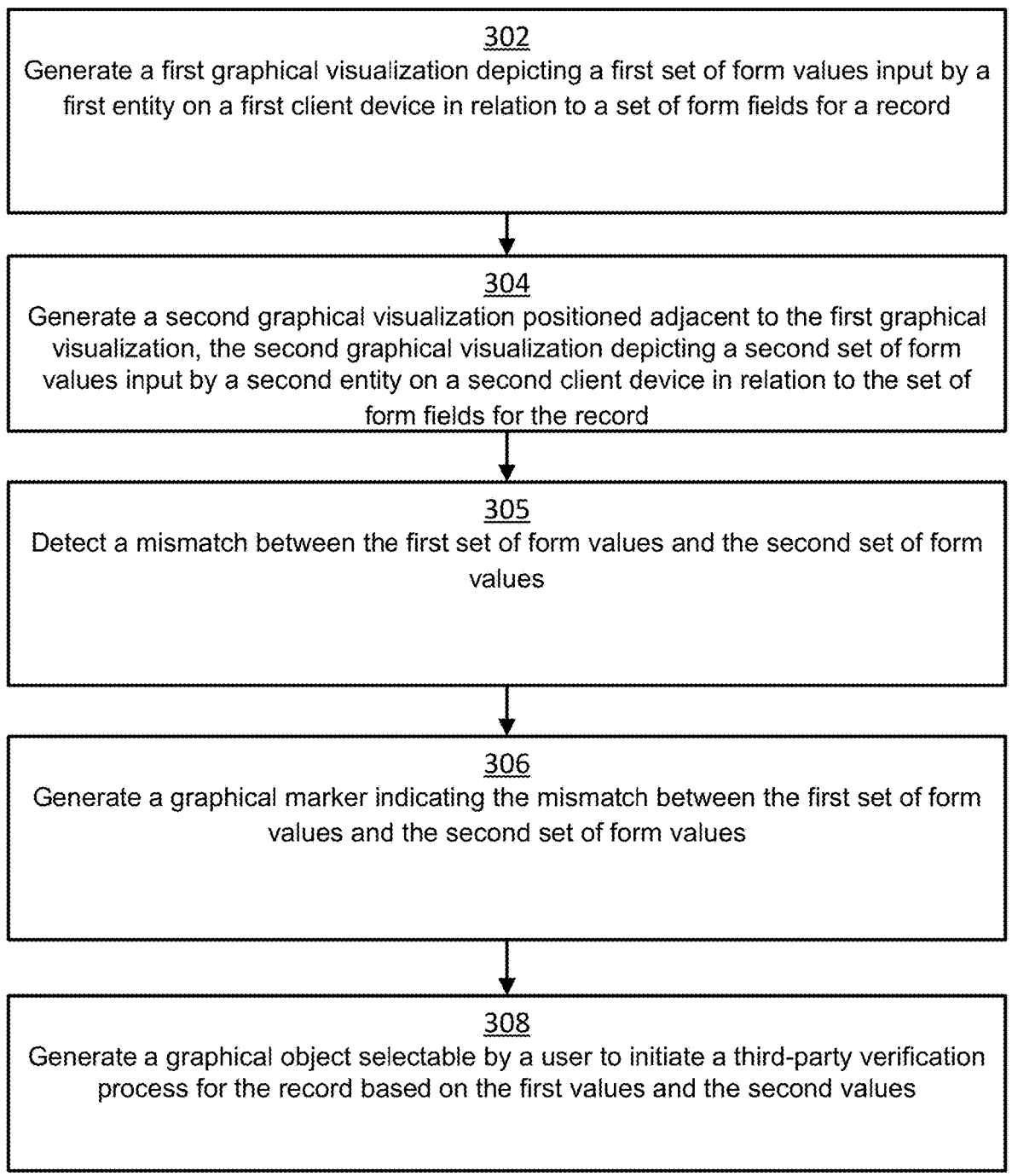
FIG. 3 is a flowchart of an example of a process for generating a graphical user interface according to some aspects of the present disclosure.

FIG. 3 is a flowchart of an example of a process for generating a GUI according to some aspects of the present disclosure. Other examples may include more operations, fewer operations, different operations, or a different order of the operations shown in FIG. 3.

At block 302, a processor generates a first graphical visualization depicting a first set of form values input by a first entity on a first client device in relation to a set of form fields for a record. The first form values may be scanned from a document using image recognition technology or manually typed by the first entity. The first graphical visualization may depict the first set of form values, data types associated with the first set of form values, indices associated with the form values, or any other suitable information related to the first set of form values.

At block 304, a processor generates a second graphical visualization positioned adjacent to the first graphical visualization. The second graphical visualization can depict a second set of form values input by a second entity on a second client device in relation for the set of form fields for the record. The second graphical visualization may include the second set of form values, data types associated with the second set of form values, indices associated with the second set of form values, or any other suitable information related to the second set of form values.

At block 305, the processor detects a mismatch among the first set of values and a second set of values. The processor can detect the mismatch by comparing the first set of values with the second set of values. If a pair of corresponding values are not identical or do not fall within an acceptable range of values, the processor can flag the pair of corresponding values as being mismatches.

At block 306, the processor generates a graphical marker indicating the mismatch between the first set of values and the second set of values. The graphical marker may be displayed as a box or other shape around a value in the first set of values or the second set of values that is identified as a mismatch. The box may have a solid colored line, a dashed line, or any suitable graphical marker. Different colors may be used for different types of mismatches. There may be any number of graphical markers corresponding to any number of mismatches.

At block 308, the processor generates a graphical object selectable by a user to initiate a third-party verification process for the record based on the first set of form values and the second set of form values. The third-party verification process may involve the first set of form values and the second set of form values being transmitted to a third entity and a fourth entity for further verification. The third-party verification process may allow the third entity and the fourth entity to output the record to a fifth entity.

Figure 4:
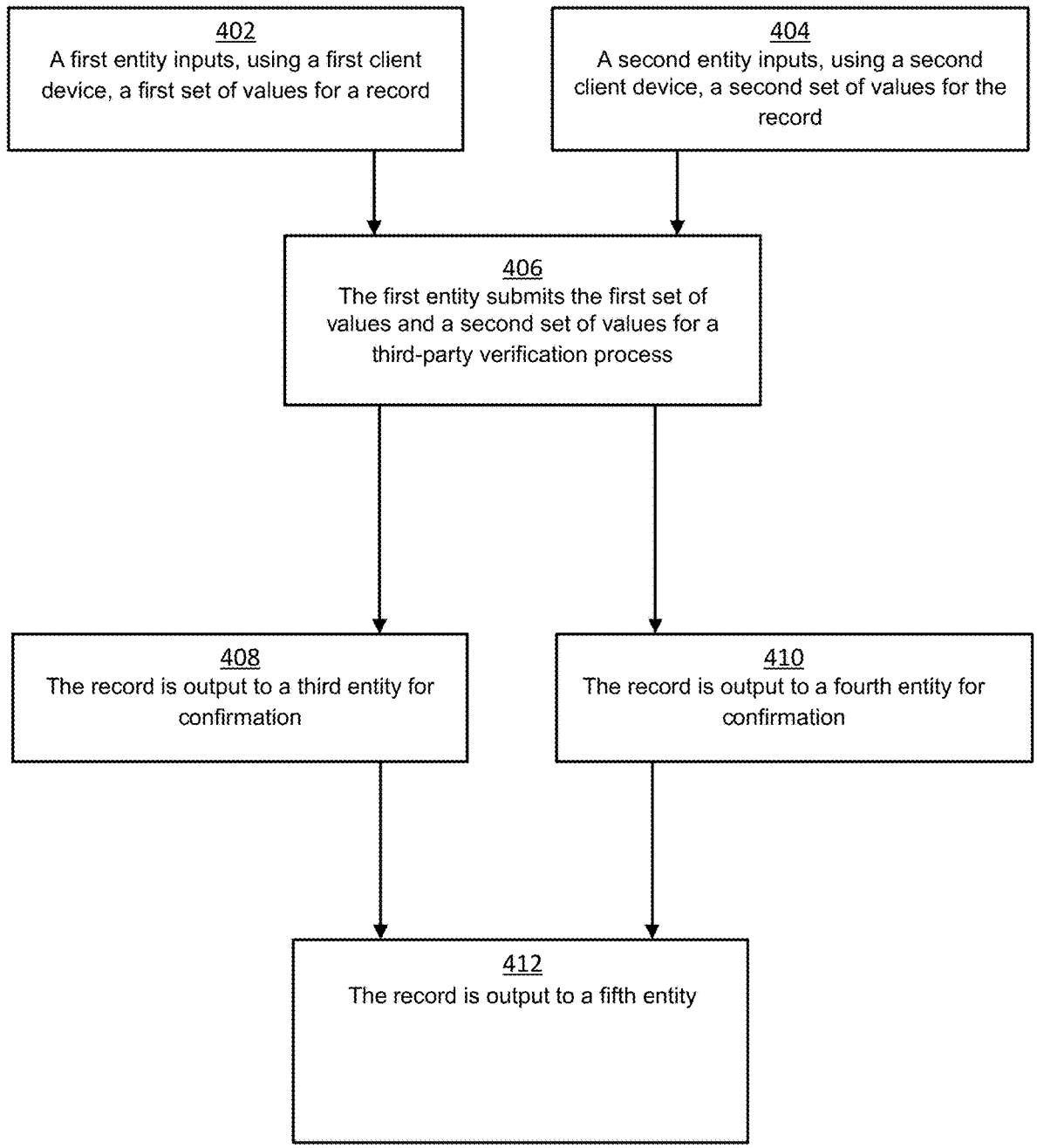
FIG. 4 is a flowchart of an example of process for engaging in a third-party verification process for a record according to some aspects of the present disclosure.

Using the GUI to allow the first entity and the second entity to correct mismatches prior to initiating the third-party verification process may reduce errors during the third-party verification process. For example, the processor may prompt the first entity or the second entity to manually enter corrected information to resolve the mismatch, prior to initiating the third-party verification process. One example of such a third-party verification process is shown in FIG. 4. Other examples may include more operations, fewer operations, different operations, or a different order of the operations shown in FIG. 4.

At block 402, a first entity operates a first client device to input a first set of values for a record. The first entity may be an institution, such as a bank or a broker. The first set of values may include a date, a time, an amount, an identification number or, a price, an account number, a string of text indicating instructions or notes related to the record, or any other suitable values. The first set of values may correspond to a first set of form fields that may be associated with the record.

At block 404, a second entity operates a client device to input a second set of values for the record. The first entity may be an institution that is different from the first entity. The second set of values may include the same data types as the first set of values. The second set of values may correspond to a second set of form fields that may be associated with the record. The second set of form fields may be the same as or different from the first set of form fields, and the second set of values may be the same as or different from the first set of values.

At block 406, the first entity submits the first set of values for a third-party verification process, and the second entity submits the second set of values for the third-party verification process. The third party verification process may require that the first set of values and the second set of values do not contain any mismatches.

At block 408, the first entity or the second entity transmits the record to a third entity for confirmation. The third entity may further verify the record through the third-party verification process that may be independent from the automatic validation that may be performed by the first entity or the second entity. The third entity may include an institution that may facilitate the third-party verification of the record, such as a clearing house. The third entity may verify the record by comparing data in the record with data on a server or any other suitable data storage device. The third entity is different from the first entity and the second entity.

At block 410, the first entity or the second entity transmits the record to a fourth entity for confirmation. The fourth entity may further verify the record through a verification process that may be independent from the verification processes that may be performed by the first entity or the second entity. The fourth entity may include an institution that may facilitate the verification of the record, such as a clearing house. The fourth entity may be different from the first entity and the second entity.

At block 412, the record is output to a fifth entity. The fifth entity may receive the record from the third entity and the fourth entity. The fifth entity may store the record or implement the record for facilitating a process associated with the record. The fifth entity may be an institution that can initiate a trade of an item based on form values associated with the record. For example, the fifth entity may be a depository, and the item may be a security. The fifth entity may further verify the record to ensure that the form values associated with the record are consistent with values in a database or other data storage format.

Figure 5:
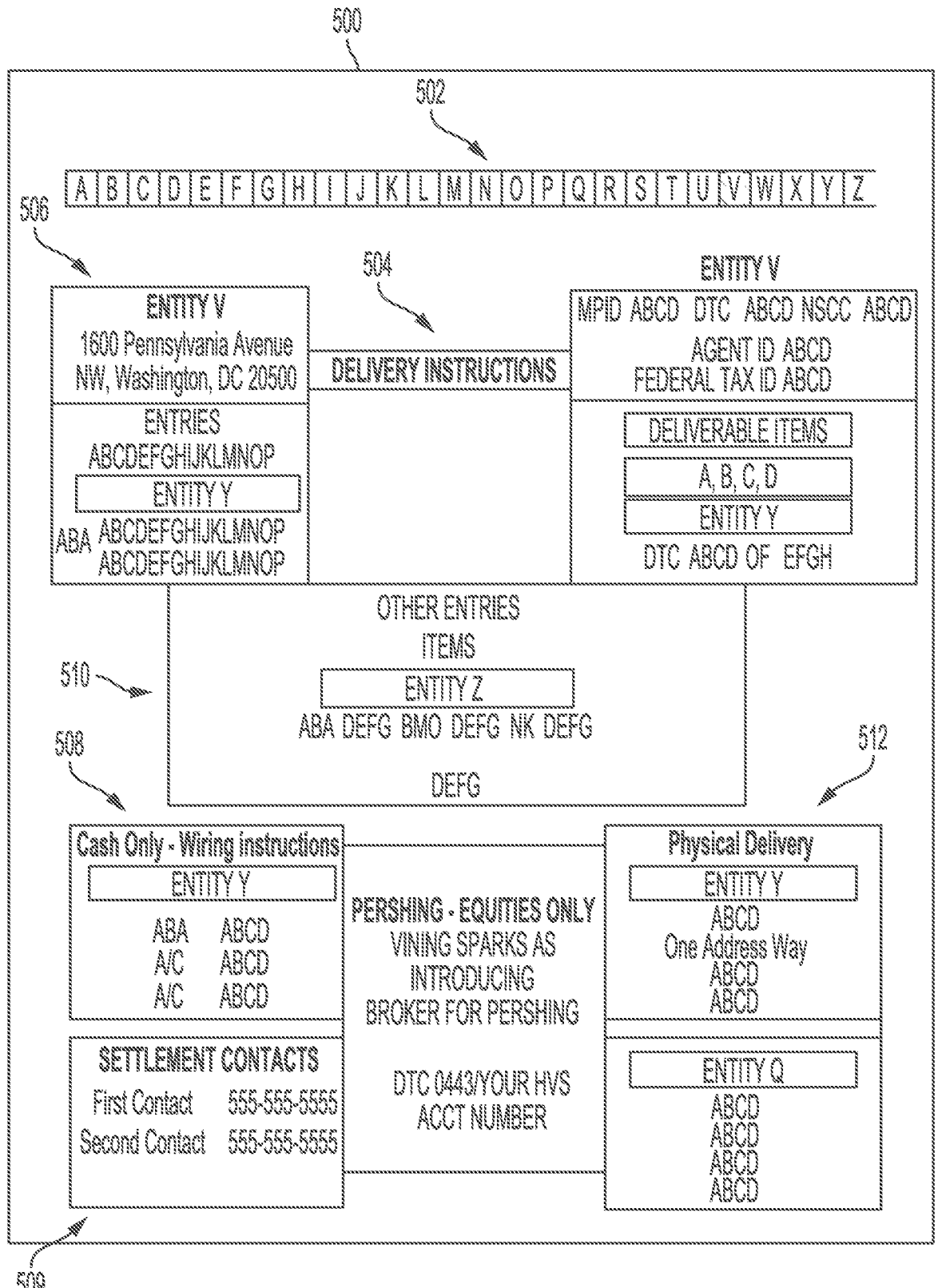
FIG. 5 depicts an example of an interface page including an alphabetical lookup feature for allowing a first entity to retrieve instructions relating to a second entity according to some aspects of the present disclosure.

It may be desirable for the first entity to have access to instructions that may be used for transmitting information or documents from the first entity to the second entity. FIG. 5 depicts an example of an interface page 500 including an alphabetical lookup feature 502 for allowing a first entity to retrieve instructions relating to a second entity according to some aspects of the present disclosure. In some examples, the alphabetical lookup feature 502 may include clickable boxes containing letters. The clickable boxes may correspond to entities that include names that begin with the letter in each corresponding clickable box.

Once a selected entity has been selected, the interface page 500 may display delivery instructions 504 that may be related to the entity. The delivery instructions 504 may be displayed in boxes, with each box corresponding to delivery instructions for a particular type of deliverable item. For example, a first deliverable item may correspond to a first set of delivery instructions in a first box for delivering the item via a first entity, and a second deliverable item may correspond to a second set of delivery instructions in a second box for delivering the item via a second entity. Each box may contain a name of an entity related to the type of deliverable item listed in the box and a telephone number that may be associated with the entity. The delivery instructions 504 can include a physical mailing address 506, a physical delivery address 512, electronic delivery information, such as a URL or ID number, or any other suitable delivery instructions 504. The interface page 500 may also display instructions for accessing an account 508, instructions for delivering particular types of deliverable items 510, a list of deliverable items, contact information 509 associated with the selected entity, or any other suitable items for delivering items among a first entity and the selected entity. Delivering items according to the delivery instructions 504 provided by the interface page 500 may help facilitate a third-party verification process related to a record, or a transmission process related to the record by providing the first entity and the second entity with access to recent data for inputting into the first set of form values and the second set of form values.

Figure 6:
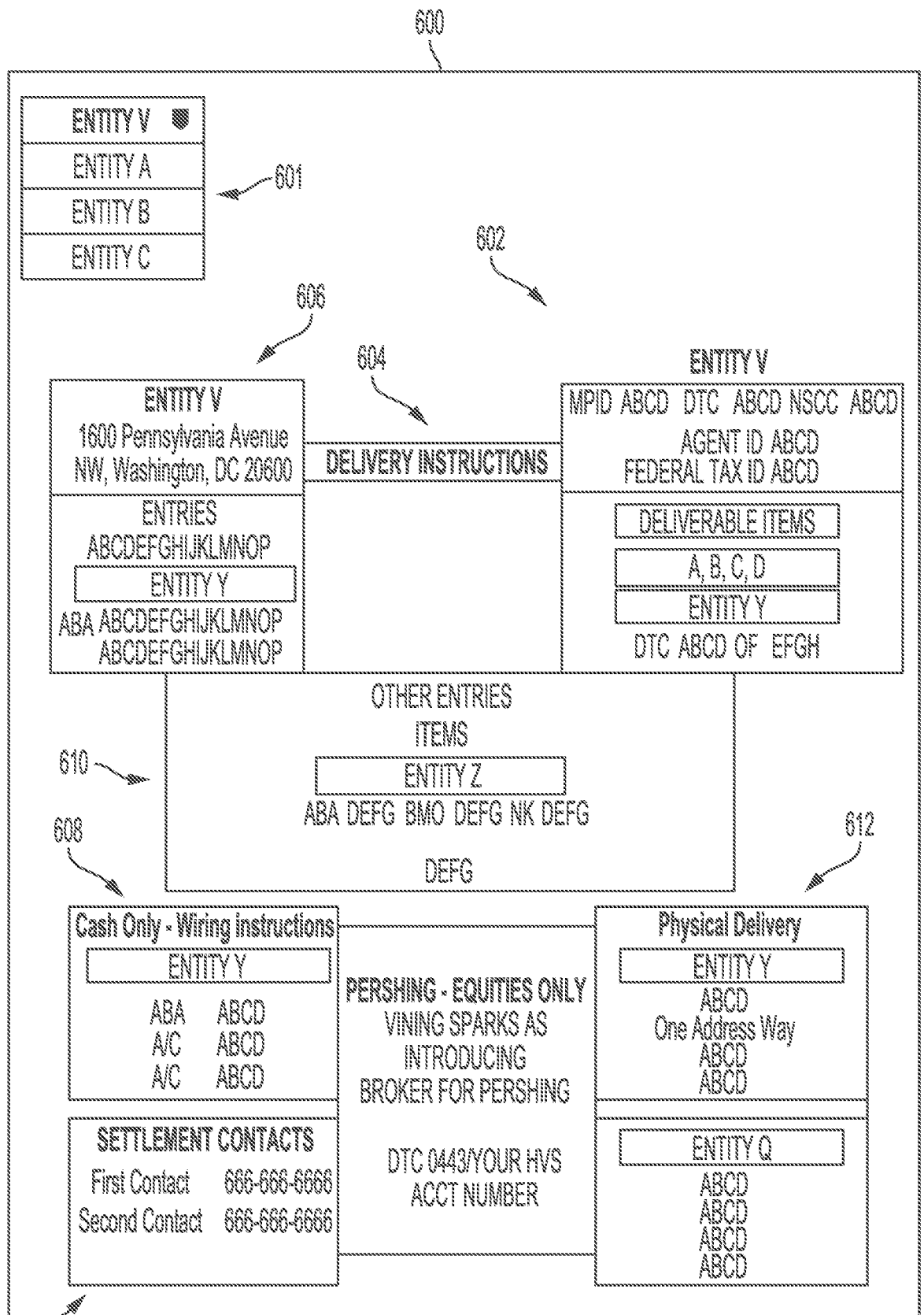
FIG. 6 depicts an example of an interface page including a menu-based lookup feature for allowing a first entity to retrieve instructions relating to a second entity according to some aspects of the present disclosure.

While the example shown in FIG. 5 involves an alphabetical lookup feature 502, other examples may involve other types of graphical elements for performing similar functionality. For instance, FIG. 6 depicts an example of an interface page 600 including a menu-based lookup 601 feature for allowing a first entity to retrieve instructions relating to a second entity according to some aspects of the present disclosure. In some examples, the menu-based lookup 601 may include clickable boxes containing letters. The clickable boxes may correspond to entities that include names that begin with the letter in each corresponding clickable box.

Once a selected entity has been selected, the interface page 600 may display delivery instructions 604 that may be related to the entity. The delivery instructions 604 may be displayed in boxes, with each box corresponding to delivery instructions for a particular type of deliverable item. For example, a first deliverable item may correspond to a first set of delivery instructions in a first box for delivering the item via a first entity, and a second deliverable item may correspond to a second set of delivery instructions in a second box for delivering the item via a second entity. Each box may contain a name of an entity related to the type of deliverable item listed in the box and a telephone number that may be associated with the entity. The delivery instructions 604 can include a physical mailing address 606, a physical delivery address 612, electronic delivery information, such as a URL or ID number, or any other suitable delivery instructions 604. The interface page 600 may also display instructions for accessing an account 608, instructions for delivering particular types of deliverable items 610, a list of deliverable items, contact information 609 associated with the selected entity, or any other suitable items for delivering items among a first entity and the selected entity. Delivering items according to the delivery instructions 604 provided by the interface page 600 may help facilitate a third-party verification process related to a record, or a transmission process related to the record.

Figure 7:
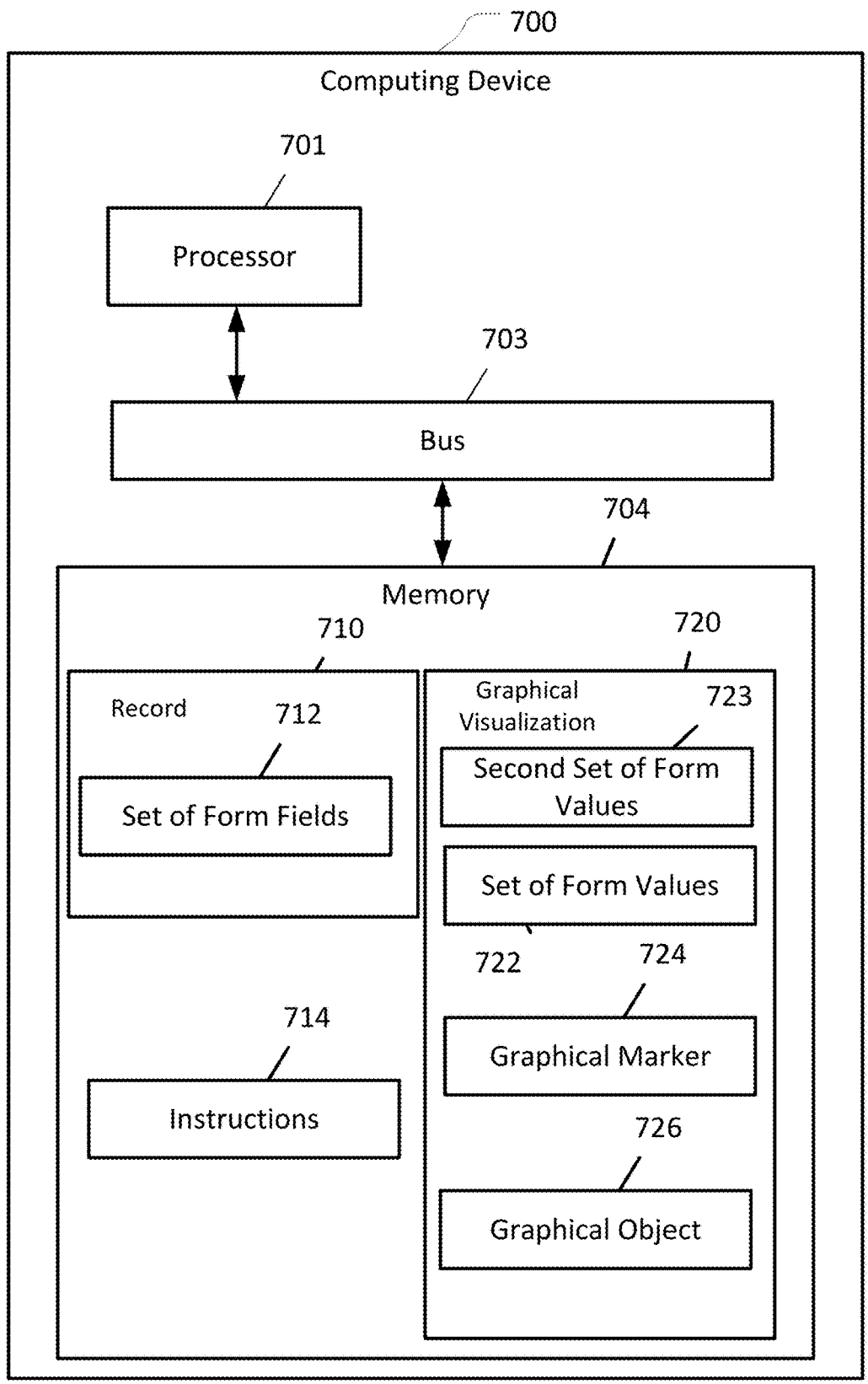
FIG. 7 is a block diagram of a computing device usable for implementing some aspects of the present disclosure.

FIG. 7 is a block diagram of a computing device 700 usable for implementing some aspects of the present disclosure. The computing device 700 may include a processor 701 and a memory 704 that may be communicatively coupled by a bus 703. Non-limiting examples of the processor 701 include a Field-Programmable Gate Array (FPGA), an application-specific integrated circuit (ASIC), a microprocessor, etc. The processor 701 can execute instructions 714 stored in the memory 704 to perform one or more operations. In some examples, the instructions can include processor-specific instructions generated by a compiler or an interpreter from code written in any suitable computer-programming language, such as C, C++, C#, etc. The memory 704 can include one memory device or multiple memory devices. The memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory device can include a computer-readable medium from which the processor 701 can read instructions 714. A computer-readable medium can include electronic, optical, magnetic, or other storage devices capable of providing the processor 701 with computer-readable instructions or other program code. Non-limiting examples of a computer-readable medium include a magnetic disk, memory chip, ROM, random-access memory (RAM), an ASIC, a configured processor, optical storage, or any other medium from which a computer processor can read the instructions 714.

While the memory 704 is shown in FIG. 1 as being local and internal to the computing device 700, in other examples the memory 704 can be external to the computing device 700 and coupled thereto. For example, the memory 704 can be coupled to the computing device 700 by a cable or a local area network. In one such example, the memory 704 may be a distributed storage system accessible to the computing device 700 via a local area network. Thus, the memory 704 can be any suitable memory 704 capable of having its file content controlled by the computing device 700.

The memory 704 can include a record 712 that may include a set of form fields 710 associated with the record 712. The memory 704 may also include a graphical visualization 720 or instructions to generate the graphical visualization 720. The graphical visualization may display a set of form values 722. The graphical visualization 720 may include a graphical marker 724 for indicating a mismatch among the set of form values 722 and a second set of form values 723. The graphical visualization 720 may also include a graphical object 726 that may be selected for initiating a third-party verification process.

Figure 8:
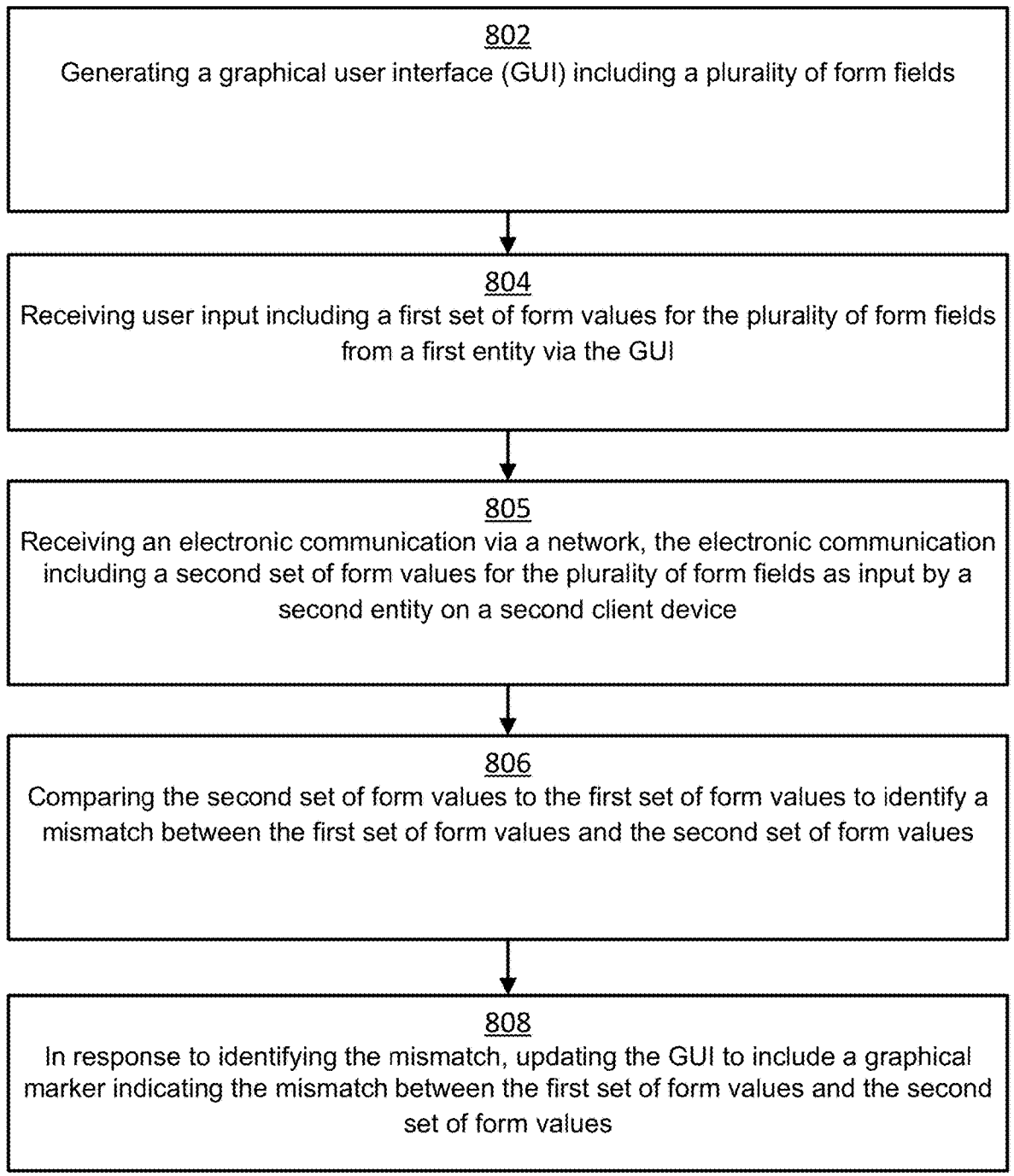
FIG. 8 is a flowchart of an example of a process for identifying a mismatch according to some aspects of the present disclosure.

FIG. 8 is a flowchart of an example of a process for identifying a mismatch according to some aspects of the present disclosure. Other examples may involve more operations, fewer operations, different operations, or a different order of the operations than is shown in FIG. 8.

At block 802, a first client device generates a first graphical user interface (GUI) including a set of form fields. The first GUI can be displayed on a display device that may be communicatively coupled to the first client device.

At block 804, the first client device receives user input including a first set of form values for the plurality of form fields from a first entity via the first GUI. The first entity may enter the first set of form values with relation to a set of form fields displayed on the first GUI.

At block 805, the first client device receives an electronic communication via a network, the electronic communication including a second set of form values for the plurality of form fields as input by a second entity on a remote client device (e.g., the second client device described above). The electronic communication may be an e-mail or any other suitable electronic communication.

At block 806, the first client device compares the second set of form values to the first set of form values to identify a mismatch between the first set of form values and the second set of form values. The first client device may then transmit a notification to the second client device to indicate the mismatch to the second entity. In response to receiving the notification, the second client device may generate a second GUI for displaying the mismatch to the second entity. The second GUI may prompt the second entity to enter corrected values to resolve the mismatch. Additionally or alternatively, the first GUI may prompt the first entity to enter corrected values to resolve the mismatch. In some examples, the first GUI and the second GUI may display the first set of form values concurrently with the second set of form values.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A client device comprising:
   a processor; and
   a memory comprising program code that is executable by the processor for causing the processor to:
   receive user input including a first set of form values for a plurality of form fields from a first entity;
   receive an electronic communication via a network, the electronic communication including a second set of form values for the plurality of form fields as input by a second entity on a remote client device;
   compare the second set of form values to the first set of form values to identify a mismatch between the first set of form values and the second set of form values; and
   in response to identifying the mismatch, generate an output indicating the mismatch between the first set of form values and the second set of form values.

2. The client device of claim 1, wherein the user input is first user input, and wherein the memory further comprises program code that is executable by the processor for causing the processor to, subsequent to generating the output:
   receive second user input including a replacement value for a form field among the plurality of form fields, the replacement value being configured to resolve the mismatch; and
   in response to detecting that the mismatch is resolved, generate another output indicating that the mismatch was resolved.

3. The client device of claim 1, wherein the memory further comprises program code that is executable by the processor for causing the processor to transmit a notification to the second entity indicating the mismatch.

4. The client device of claim 1, wherein the memory further comprises program code that is executable by the processor for causing the processor to transmit a notification indicating the mismatch to the remote client device, the remote client device being configured to receive the notification and generate a graphical user interface that includes a corresponding graphical marker indicating the mismatch.

5. The client device of claim 1, wherein the memory further comprises program code that is executable by the processor for causing the processor to:
   receive the second set of form values from the remote client device via the network; and
   transmit the first set of form values to the remote client device via the network, the remote client device being configured to receive the first set of form values and generate a graphical user interface that displays the first set of form values.

6. The client device of claim 1, wherein the memory further comprises program code that is executable by the processor for causing the processor to display the first set of form values concurrently with the second set of form values in a graphical user interface.

7. The client device of claim 1, wherein the memory further comprises program code that is executable by the processor for causing the processor to:
   obtain an executable software plugin from a source via the network, the executable software plugin being configured to detect the mismatch and responsively generate the output; and
   integrate the executable software plugin into a software application on the client device, the software application being distinct from the executable software plugin and configured to generate a graphical user interface with the plurality of form fields.

8. A method comprising:
   receiving, by a processor of a client device, user input including a first set of form values for a plurality of form fields from a first entity;
   receiving, by the processor, an electronic communication via a network, the electronic communication including a second set of form values for the plurality of form fields as input by a second entity on a remote client device;
   comparing, by the processor, the second set of form values to the first set of form values to identify a mismatch between the first set of form values and the second set of form values; and
   in response to identifying the mismatch, generating, by the processor, an output indicating the mismatch between the first set of form values and the second set of form values.

9. The method of claim 8, wherein the user input is first user input, and wherein the method further comprises, subsequent to generating the output:
   receiving, by the processor, second user input including a replacement value for a form field among the plurality of form fields, the replacement value being configured to resolve the mismatch; and
   in response to detecting that the mismatch is resolved, generating, by the processor, another output indicating that the mismatch was resolved.

10. The method of claim 8, further comprising:
    transmitting, by the processor, a notification to the second entity indicating the mismatch.

11. The method of claim 8, further comprising:
    transmitting, by the processor, a notification indicating the mismatch to the remote client device, the remote client device being configured to receive the notification and generate a graphical user interface that includes a corresponding graphical marker indicating the mismatch.

12. The method of claim 8, further comprising:
receiving, by the processor, the second set of form values from the remote client device via the network; and
transmitting, by the processor, the first set of form values to the remote client device via the network, the remote client device being configured to receive the first set of form values and generate a graphical user interface that displays the first set of form values.

13. The method of claim 8, further comprising:
displaying, by the processor, the first set of form values concurrently with the second set of form values in a graphical user interface.

14. The method of claim 8, further comprising:
obtaining, by the processor, an executable software plugin from a source via the network, the executable software plugin being configured to detect the mismatch and responsively generate the output; and
integrating, by the processor, the executable software plugin into a software application on the client device, the software application being distinct from the executable software plugin and configured to generate a graphical user interface with the plurality of form fields.

15. A non-transitory computer-readable medium comprising program code that is executable by a processor for causing the processor to:
receive user input including a first set of form values for a plurality of form fields from a first entity via;
receive an electronic communication via a network, the electronic communication including a second set of form values for the plurality of form fields as input by a second entity on a remote client device;
compare the second set of form values to the first set of form values to identify a mismatch between the first set of form values and the second set of form values; and
in response to identifying the mismatch, generate an output indicating the mismatch between the first set of form values and the second set of form values.

16. The non-transitory computer-readable medium of claim 15, wherein the user input is first user input, and further comprising program code that is executable by the processor for causing the processor to, subsequent to generating the output:
receive second user input including a replacement value for a form field among the plurality of form fields, the replacement value being configured to resolve the mismatch; and
in response to detecting that the mismatch is resolved, generate another output indicating that the mismatch was resolved.

17. The non-transitory computer-readable medium of claim 15, further comprising program code that is executable by the processor for causing the processor to transmit a notification to the second entity indicating the mismatch.

18. The non-transitory computer-readable medium of claim 15, further comprising program code that is executable by the processor for causing the processor to:
transmit a notification indicating the mismatch to the remote client device, the remote client device being configured to receive the notification and generate a graphical user interface that includes a corresponding graphical marker indicating the mismatch.

19. The non-transitory computer-readable medium of claim 15, further comprising program code that is executable by the processor for causing the processor to:
receive the second set of form values from the remote client device via the network; and
transmit the first set of form values to the remote client device via the network, the remote client device being configured to receive the first set of form values and generate a graphical user interface that displays the first set of form values.

20. The non-transitory computer-readable medium of claim 15, further comprising program code that is executable by the processor for causing the processor to display the first set of form values concurrently with the second set of form values in a graphical user interface.

* * * * *